(No Model.)
D. A. JOHNSON.
THILL COUPLING.
No. 365,131. Patented June 21, 1887.
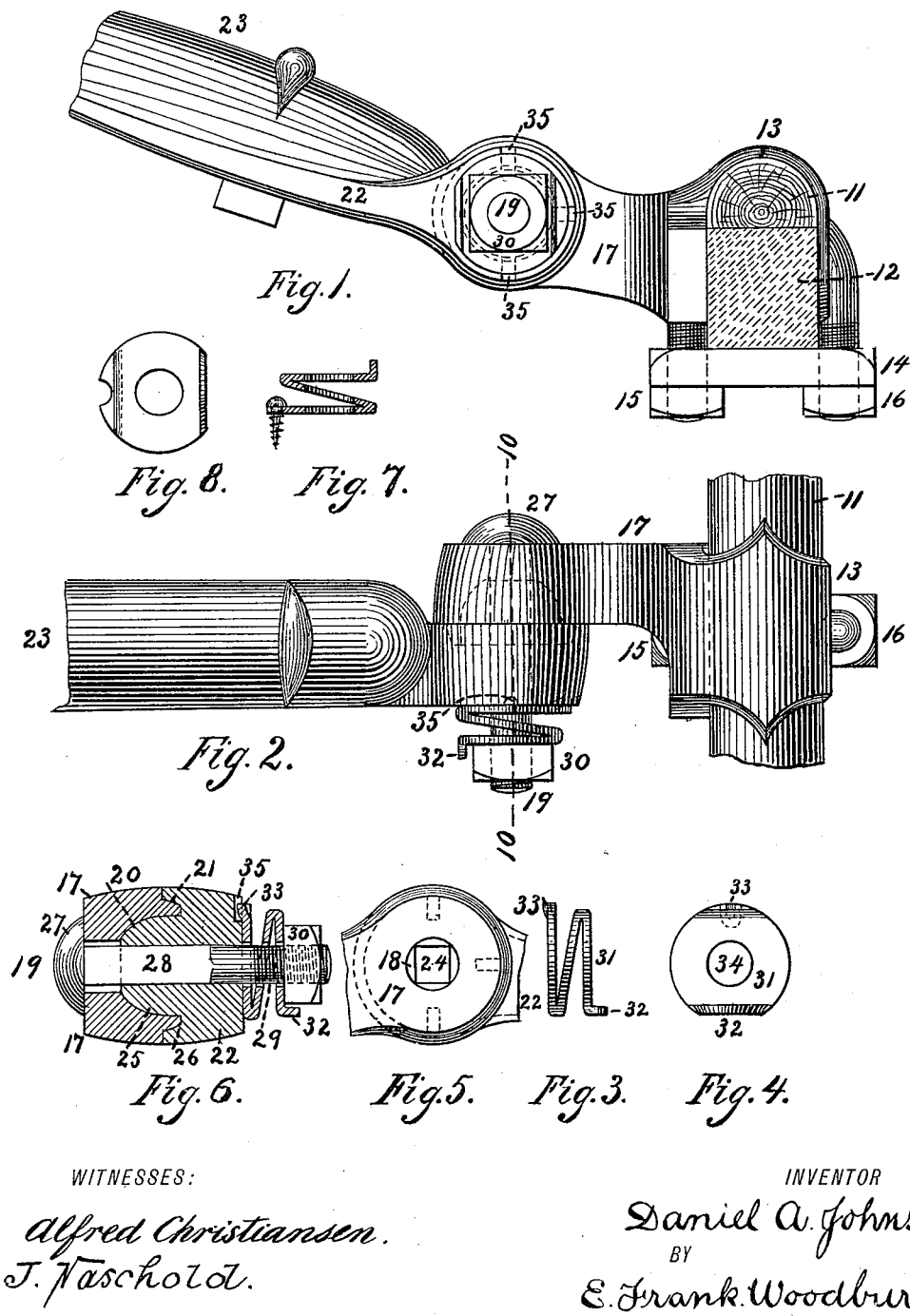
WITNESSES:
Alfred Christiansen.
J. Waschold.
INVENTOR
Daniel A. Johnson.
BY
E. Frank Woodbury.
ATTORNEY

UNITED STATES PATENT OFFICE.

DANIEL A. JOHNSON, OF BOSTON, MASSACHUSETTS.

THILL-COUPLING.

SPECIFICATION forming part of Letters Patent No. 365,131, dated June 21, 1887.

Application filed October 21, 1886. Serial No. 216,906. (No model.)

*To all whom it may concern:*

Be it known that I, DANIEL A. JOHNSON, of Boston, in the county of Suffolk and State of Massachusetts, have invented certain new and useful Improvements in Thill-Couplings, of which the following, taken in connection with the accompanying drawings, is a specification.

The object of my invention is to produce a thill-coupling that will be in every way better adapted to its uses than any other now in use; and my invention relates to thill-couplings designed as an improvement of thill-couplings as shown and described in United States Letters Patent granted to me January 1, 1878, No. 198,803, and July 31, 1883, No. 282,186; and it has for its object simplicity in construction, perfection of detail, and completeness in its capacity as a simple, strong, durable, and effective thill-coupling.

Figures 1 and 2 represent, respectively, the thill-coupling in side elevation and plan. Figs. 3 and 4 represent, respectively, in side and front elevation nut-lock used in thill-coupling. Fig. 5 is a partial side elevation of Figs. 1 and 2 without the coupling-bolt, showing style of holes in which coupling-bolt is placed. Fig. 6 is a cross-section of thill-coupling and nut-lock on line 10 10 of Fig. 2, showing their sectional arrangement in relation to coupling-bolt. Figs. 7 and 8 represent a modified style of nut-lock in section and plan, respectively, illustrating method of engaging nut-lock when in use on materials where the use of a screw is preferred as a stop.

All the parts used in thill-coupling are of suitable material correctly made.

11 and 12 represent, respectively, the wood and steel portions of a carriage-axle to which the thill-coupling is attached. Both wood and steel portions of the axle are securely fastened together, in the usual manner, by means of the clip 13, strap 14, and nuts 15 and 16.

The clip 13 is provided with the clip projection 17, which is constructed as follows: The outer portion of the clip projection 17, having a rounded end, is provided with the centrally-located hole 18, the axis of which is parallel to the longitudinal axis of axle, and the diameter of which is such as to permit the rotative movement of coupling-bolt 19. The rounded end of the clip projection is provided with the centrally-located (in relation to its position around hole 18) conical recess 20 and the conical projection 21.

One end of the shaft-iron 22 is secured to the shaft 23 in the usual manner. The other end, being rounded, has the centrally-located square hole 24, centrally around which are made the conical projection 25 and conical recess 26, both being made in such a manner that the conical projection 25 will fit into conical recess 20 and that the conical projection 21 will fit into the conical recess 26, thereby making conical joints.

The coupling-bolt 19, of sufficient length, is provided with the head 27, square portion 28, threaded end 29, and nut 30. The square portion 28 is made of such a size as will fit into the square hole 24 of the shaft-iron.

The spring nut-lock is provided with the outwardly-projecting lip 32, the raised projection 33, and holes 34. The holes 34 are made somewhat larger in diameter than the diameter of the coupling-bolt in connection with which the spring nut-lock is to be used. The lip 32 is made at such a distance from the center of the spring nut-lock that while the nut of the coupling-bolt is being made up the nut-lock revolves with the nut, for the reason that the corner of the nut comes in contact with the lip 32, thereby causing it to revolve. The rounded end of the shaft-iron 22 is also provided with the radial slots 35, into any one of which the raised projection 33 will fit when in the use of the nut-lock the raised projection 33 is made to come opposite one of the radial slots, into which it will spring and fit.

The parts of the thill-coupling, made as described, are put together in the following manner: The shaft-iron is placed in its position into and in contact with the clip projection. Then the coupling-bolt is placed in its position, the head portion of which bears against the outside of the clip projection, the threaded end projecting beyond the outside of shaft-iron, on which the nut-lock and coupling-bolt nut are placed. The nut is then screwed up until the desired spring tension of nut-lock is obtained necessary to keep the conical parts of clip projection and shaft-iron in contact. When the coupling-bolt-nut is being screwed up, the nut-lock, by reason of the lip of the nut-lock being in contact with the nut, causes the nut-lock to rotate with the nut. The nut-lock being thus revolved and compressed by the nut, the raised projection of nut-lock will spring into a radial slot in shaft-iron whenever the raised projection comes over a radial slot, and the coupling-bolt nut cannot turn back without turning back the nut-lock, which to do would require a force equal to resistance due to spring tension of nut-lock plus the resistance due to the compression of nut-lock necessary to force the nut-lock out of the radial slot in shaft-iron in which it was located.

The coupling-bolt is prevented from turning in the shaft-iron by reason of its square portion fitting into square hole. The longitudinal axis of the coupling-bolt is at a right angle to the plane of rotative movement of shaft-iron conical portions, due in use to the vertical vibratory movement of the shaft.

The result in use of my thill-coupling is, the conical portions of clip projection and shaft-iron being held in contact by the tensive force of the nut-lock caused by making up of coupling-bolt, that noise is prevented and wear of parts is compensated.

It is found in practice that the straight joints between the clip projections and shaft-iron, which may be left open joints, if desired, being subject to more wear than the conical joints, by reason of their distance from the center of rotative movement and exposure to dust, may be left in contact, or nearly so.

The modified form of nut-lock represented by Figs. 7 and 8 is used when, in many cases, for convenience, a screw can be used as a stop in connection with the cut opening in the nut-lock, through which a screw can be placed. A round-head screw can be used, over which a cut or raised projection of nut-lock would ride and stop.

The side of the nut-lock opposite the side against which the coupling-bolt presses may be fastened to that portion of the shaft-iron against which the nut-lock bears, in which case the lip 32, over which the corners of the coupling-bolt nut would pass, would perform nearly the same duty as the raised projection 33 of the nut-lock performs when arranged and operated as previously described.

What I claim as new, and desire to secure by Letters Patent, is—

In a thill-coupling, the combination of the spring nut-lock provided with lip 32, raised projection 33, with coupling-bolt and nut, and shaft-iron provided with means adapted to act as a nut-lock stop, substantially as described.

In testimony whereof I have signed my name to this specification, in the presence of two subscribing witnesses, on this 16th day of October, A. D. 1886.

DANIEL A. JOHNSON.

Witnesses:
E. FRANK WOODBURY,
ALFRED CHRISTIANSEN.